United States Patent
Blott et al.

(10) Patent No.: US 9,323,457 B2
(45) Date of Patent: Apr. 26, 2016

(54) MEMORY ARRANGEMENT FOR IMPLEMENTATION OF HIGH-THROUGHPUT KEY-VALUE STORES

(71) Applicant: Xilinx, Inc., San Jose, CA (US)

(72) Inventors: Michaela Blott, Dublin (IE); Ling Liu, Dublin (IE); Kornelis A. Vissers, Sunnyvale, CA (US)

(73) Assignee: XILINX, INC., San Jose, CA (US)

( * ) Notice: Subject to any disclaimer, the term of this patent is extended or adjusted under 35 U.S.C. 154(b) by 157 days.

(21) Appl. No.: 14/100,250

(22) Filed: Dec. 9, 2013

(65) Prior Publication Data

US 2015/0160862 A1 Jun. 11, 2015

(51) Int. Cl.
*G06F 12/00* (2006.01)
*G06F 3/06* (2006.01)
*G06F 17/30* (2006.01)
*G06F 13/00* (2006.01)
*G06F 13/28* (2006.01)

(52) U.S. Cl.
CPC ............ *G06F 3/0604* (2013.01); *G06F 3/0655* (2013.01); *G06F 3/0683* (2013.01); *G06F 17/30221* (2013.01); *G06F 17/30312* (2013.01); *G06F 17/30519* (2013.01)

(58) Field of Classification Search
CPC ... G06F 3/0604; G06F 3/0655; G06F 3/0683; G06F 17/30312; G06F 17/30221; G06F 17/30519
USPC .......................................................... 711/148
See application file for complete search history.

(56) References Cited

U.S. PATENT DOCUMENTS

| | | | |
|---|---|---|---|
| 6,446,141 B1 | 9/2002 | Nolan et al. | |
| 6,505,265 B1 * | 1/2003 | Ishikawa et al. | 710/113 |
| 9,009,392 B2 * | 4/2015 | Jain | G06F 12/0871 |
| | | | 711/103 |
| 2001/0019509 A1 | 9/2001 | Aho et al. | |
| 2010/0217953 A1 | 8/2010 | Beaman et al. | |
| 2010/0325199 A1 | 12/2010 | Park et al. | |
| 2012/0072656 A1 | 3/2012 | Archak et al. | |
| 2012/0102298 A1 | 4/2012 | Sengupta et al. | |
| 2013/0103729 A1 * | 4/2013 | Cooney | G06F 17/30126 |
| | | | 707/831 |
| 2013/0282964 A1 * | 10/2013 | Sengupta et al. | 711/103 |

OTHER PUBLICATIONS

U.S. Appl. No. 13/683,720, Blott et al., filed Nov. 11, 2012, San Jose, CA USA.

Lim, K. et al., "Thin Servers with Smart Pipes: Designing SoC Accelerators for Memcached", $40^{th}$ International Symposium on Computer Architecture, ISCA 2013, Jun. 23-27, 2013, 12 pages, Tel-Aviv, Israel.

Ouyang, X., et al., "SSD-Assisted Hybrid Memory to Accelerate Memcached Over High Performance Networks", IEEE $41^{st}$ International Conference on Parallel Processing, ICPP 2012, Sep. 10-13, 2012, pp. 470-479, 10-13, Pittsburgh, PA, USA.

(Continued)

*Primary Examiner* — Mark Giardino, Jr.
(74) *Attorney, Agent, or Firm* — John J. King

(57) ABSTRACT

A circuit for processing data is described. The circuit comprises an input for receiving a request for implementing a key-value store data transaction; a plurality of memory interfaces associated with different memory types enabling access to a plurality of memory devices associated with a key-value store; and a memory management circuit controlling the routing of data by way of the plurality of memory interfaces based upon a data transfer criterion.

20 Claims, 8 Drawing Sheets

(56) References Cited

OTHER PUBLICATIONS

Berezecki, M. et al., "Many-Core Key-Value Store", Green Computing Conference and Workshops (IGCC), 2011 International, pp. 1-8, Jul. 25-28, 2011.

Berezecki, M. et al., "Power and Performance Evaluation of Memchaced on the TILEPro64 Architecture", Sustainable Computing: Informatics and Systems, vol. 2 issue, Jun. 2012, pp. 81-90.

Hetherington, Tayler H., et al., "Characterizing and Evaluating a Key-value Store Application on Heterogeneous CPU-GPU Systems", IEEE Internatinal Symposium on Performance Analysis of Systems and Software (ISPASS), Apr. 1-3, 2012, pp. 11, New Brunswick, NJ.

U.S. Appl. No. 14/607,978, Blott et al., filed Jan. 28, 2015, San Jose, CA USA.

* cited by examiner

MEMORY ARRANGEMENT FOR IMPLEMENTATION OF HIGH-THROUGHPUT KEY-VALUE STORES

FIELD OF THE INVENTION

One or more implementations generally relate to integrated circuits, and more particularly to circuits for and methods of processing data.

BACKGROUND

Integrated circuits may be implemented in a device for processing data. Further, the data may be processed according to different protocols which may be proprietary protocols or public protocols which conform to data transmission standards. However, depending upon a given protocol, different hardware elements may be required. The implementation of the various hardware elements may affect the performance of the device, such as throughput, latency and power consumption, for example. Each of these performance criteria continues to be significant in the evaluation of a device. That is, circuit developers continue to improve the speed of a device while reducing the power consumed by the device.

Further, there is considerable effort to reduce the cost of implementing integrated circuits. One way of reducing the cost of implementing integrated circuits is to enable a given circuit to be used in a variety of different applications. That is, if a circuit can be programmed to operate in different configurations and implement different circuits, a more cost efficient device having integrated circuits may be achieved. One area of data processing which may benefit from circuit improvements is the implementation of a key-value store (KVS). A conventional server may use its main memory for the key-value store, and has a network adapter to interface with client devices. While different types of memory can be used to store data, different types of memory have different operating parameters and can affect the operation of a KVS. Accordingly, there is a need for devices which provide flexibility and therefore improve the performance of data processing.

SUMMARY

A circuit for processing data is described. The circuit comprises an input for receiving a request for implementing a key-value store data transaction; a plurality of memory interfaces associated with different memory types enabling access to a plurality of memory devices associated with a key-value store; and a memory management circuit controlling the routing of data by way of the plurality of memory interfaces based upon a data transfer criterion.

A circuit for processing data may alternatively comprise an input for receiving a request for implementing a key-value store data transaction; a first memory interface enabling access to a memory location of a first type of memory associated with a key-value store; a second memory interface enabling access to a memory location of a second type of memory associated with the key-value store; and a memory management circuit coupled between the input and the first and second memory interfaces, the memory management circuit controlling the routing of data by way of the first and second memory interfaces based upon a data transfer criterion.

A method of processing data is also described. The method comprises receiving a request for implementing a data transaction associated with a key-value store; controlling the routing of data by way of a plurality of memory interfaces based upon a data transfer criterion; enabling accessing a memory location of a first type of memory associated with the key-value store by way of a first memory interface; and enabling accessing a memory location of a second type of memory associated with the key-value store a second memory interface.

DETAILED DESCRIPTION OF THE DRAWINGS

Key-value stores (KVS) are a fundamentally important middleware layer in most data centers. The function of a key-value store is to store and retrieve values associated with keys (rather than indexed with addresses) over a communication or network interface. In recent years, key-value stores are widely deployed in data centers to accelerate the performance of their web presence via caching the most frequently accessed objects. Because the KVS server is typically used to cache the contents of a large database, an important aspect of such a KVS server is its storage density, where the larger the cache, the more effective the KVS becomes. Furthermore, throughput and latency of the KVS server are important characteristics because they essentially determine the speed with which websites can be assembled. Finally, power consumption becomes increasingly important as a server's operating expenses (dominated by its energy consumption) is starting to be larger than its capitalization expenses.

The various circuits and methods set forth below describe a solid state drive (SSD) assisted data-flow architecture for implementation of key-value stores in programmable logic or custom ICs. One aspect of the various implementations is that, through the combination of different types of memories, an extremely high throughput (e.g. 80 Gbps) can be achieved along with very high storage density (e.g. terabytes) and very low latency and power consumption. The circuits and methods set forth below allows a user to scale the necessary storage density to many terabytes through the use of a hybrid memory architecture with SSDs and DRAMs for example, while still providing high data throughput with very low latency and high power efficiency. More particularly, this performance can be achieved through the smart distribution of data between DRAM and SSD, and through storing data in many SSDs in parallel, thereby increasing the access bandwidth though overprovisioning. While the architecture could be implemented either in a programmable logic device, such as a field programmable gate array (FPGA) which will be described in more detail below, or an application specific integrated circuit (ASIC), the required flexibility of an improved KVS architecture makes it more suited towards FPGAs or some other programmable logic devices.

Figure 1:
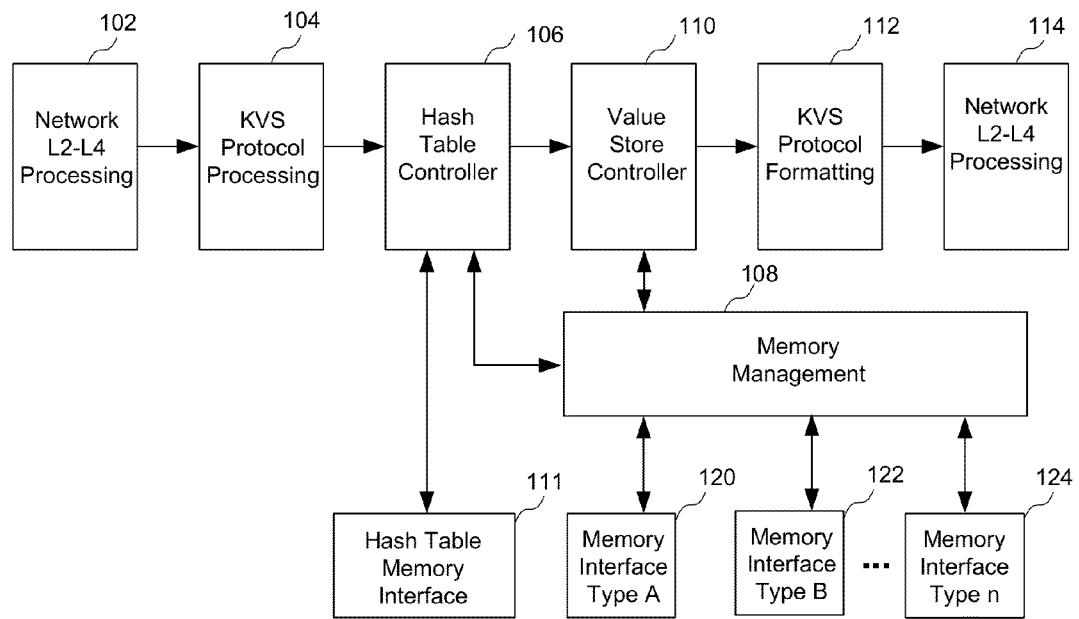
FIG. 1 is a block diagram of a circuit for processing data.

Turning first to FIG. 1, a block diagram of a circuit for processing data is shown. In particular, a network L2-L4 processing block 102 provides data associated with a KVS to a KVS protocol processing block 104. The network layer processing block enables data to be processed according to an Open Systems Interconnection (OSI) reference model, where the L2 layer relates to a data link layer which defines procedures for operating communication links and detects and corrects packet errors, the L3 layer determines how data is transferred between network devices and enables routing packets to unique network device addresses, and the L4 layer relates to the transport layer which manages end-to-end message delivery in the network. While the circuit of FIG. 1 relates to an OSI reference model and refers to network layers L2-L4, it should be understood that the reference to network layers is provided by way of example, and the circuits and methods could be implemented in any type of data network, and particularly any type of data network implementing a key-value store.

Data generated by the KVS protocol processing block 104 is provided to a hash table controller 106 which is assisted by a memory management circuit 108. The memory management circuit 108 controls the operation memories associated with the value store controller 110. The memory management circuit 108 allocates address pages in the value store, provides one or more addresses to the hash table, and determines which type of memory receives the data. A hash table memory interface 111 enables accessing a hash memory, which may be a DRAM or SRAM for example, or alternatively a BRAM of a programmable logic device which will be described in more detail below in reference to FIG. 17 or any other memory type. The implementation of a hash table and the operation of a KVS will be described below in more detail in reference to FIGS. 12-14. Data generated by the value store controller 110 will be provided to a KVS Protocol Formatting circuit 112, the output of which is processed by a network L2-L4 processing block 114.

The value store controller 110 will also communicate with a plurality of memory interfaces by way of the memory management circuit 108 which routes the data according to its addresses to the plurality of memory interfaces. More particularly, each of a Memory Interface Type A 120, a Memory Interface Type B 122, and a Memory Interface Type n 124 enables access to n different types of memory elements. As will be described in more detail below, Memory Interface Type A 120 may interface with a first type of memory, such as a DRAM. Memory Interface Type B 122 may interface with a second type of memory which is different than the first type of memory, such as an SSD. The Memory Interface Type n could be an interface to some other type of memory, which is also distinct from the first two types of memory, such as a conventional magnetic disk drive. As will be described in more detail below in reference to FIG. 2, each memory interface may communicate with a plurality of memory devices. Accordingly, the circuit of FIG. 1 enables the most efficient implementation of a key-value store by selectively implementing different memory devices in order to take advantage different characteristics of the memory devices.

More particularly, the circuit of FIG. 1 provides an architecture that uses a hybrid memory architecture (such as by using SSDs in combination with DRAM) that allows for significantly larger storage density. This hybrid memory architecture allows for the implementation of an extremely high throughput and high density KVS while still enabling much lower power consumption. Furthermore, the unique implementation of a custom hardware dataflow architecture with SSDs provides an improved response time compared to conventional devices.

Packets associated with the KVS may be received over one or multiple network interfaces. The network L2-L4 processing circuit 102 implements processing layers 1 to 4, enabling the KVS protocol layer to be processed to determine whether the operation is a store or retrieve operation, and what the sizes of key and value are for the key-value store operation. The hash table controller 106, which is typically associated with a hash table stored in DRAM, is accessed to determine where in memory the key-value pair is to be located. The memory management circuit 108 decides on the distribution of data between different types of memory devices (e.g. DRAM and SSD devices), enabling the value store controller 110 to access the appropriate memory (e.g. the appropriate DRAM or SSD or both) before the packet is reformatted by the KVS Protocol Formatting circuit 112 according to the KVS protocol and output by the network L2-L4 processing circuit 114.

Figure 2:
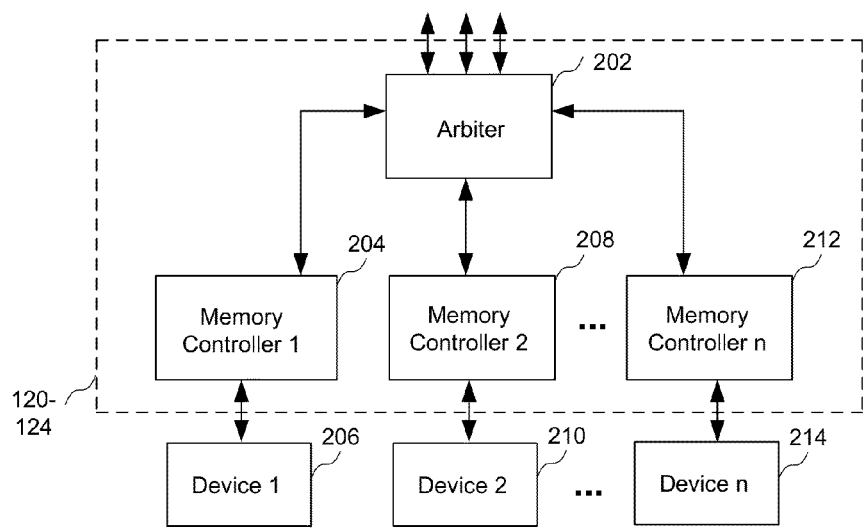
FIG. 2 is a block diagram of a memory interface of the circuit of FIG. 1.

Turning now to FIG. 2, a block diagram of a memory interface of the circuit of FIG. 1 is shown. In particular, each of the memory interfaces 120-124 may comprise an arbiter 202 coupled to a plurality of memory controllers and corresponding memory devices. For example, a first memory controller 204 is coupled to a first memory device 206, a second memory controller 208 is coupled to a second memory device 210, and an nth memory controller 212 is coupled to an nth device 214. As will be described in more detail in reference to FIGS. 5 and 6, each memory controller enables the interaction with a selected type of memory, such as a DRAM or SSD, and may be specific to a certain type of memory. As will also be described, the type of memory will be selected based upon one or more criteria to enable the most efficient processing of data in a key-value store.

Figure 3:
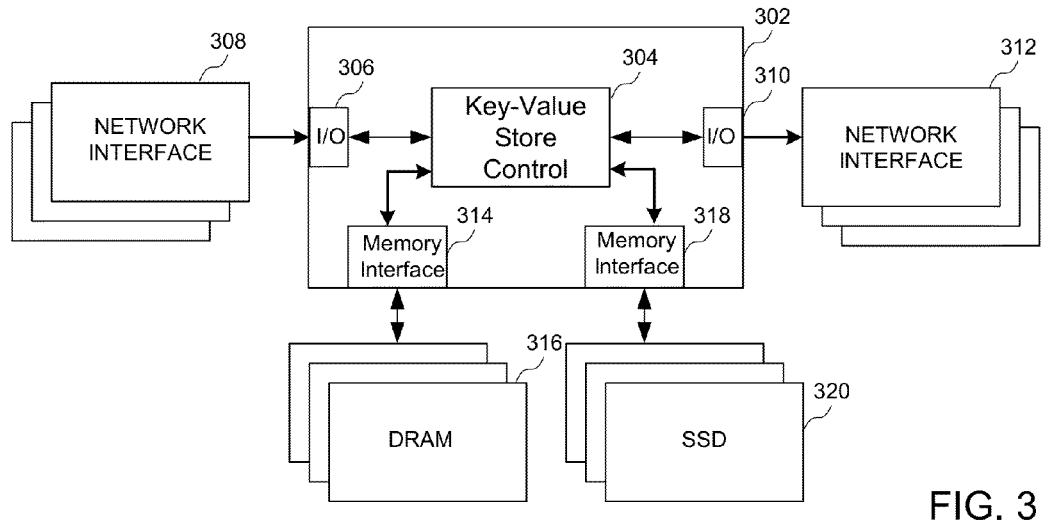
FIG. 3 is a block diagram of a circuit for enabling a key-value store implementing a plurality of memory types.

Turning now to FIG. 3, a block diagram of a circuit for enabling a key-value store implementing a plurality of memory types is shown. An integrated circuit 302 may be implemented with a key-value store control circuit 304 which interfaces with an I/O block 306 coupled to one or more network interfaces 308 for receiving data and an I/O block 310 coupled to one or more network interfaces 312 for outputting data. According to the implementation of FIG. 3, a memory interface 314 enables communicating with one or more memory devices of a first plurality of memory devices 316, shown here as DRAMs, and a second memory interface 318 communicating with one or more memory devices of a second plurality of memory devices 320, shown here as SSDs.

SSDs provide many benefits including lower cost and power consumption. However, more importantly, SSDs allow a key-value store to connect a significantly larger storage density (such as 500 GB memory) over fewer pins (for example 4 pins). That is, because SSDs utilize a high-speed serial interface such as serial advanced technology attachment (SATA), serial attached SCSI (SAS), or peripheral component interconnect express (PCIe), few input/output (I/O) pins are required. In contrast, a DRAM SODIMM requires around 140 I/O pins to connect 8 GB of storage. While an SSD generally has a slower access speed compared to a DRAM, the operation of the circuit can be improved when data is stored in a memory device for which it is suited, such as when larger data blocks are stored in SSDs. The SSDs may be NAND-based flash memory, or some other type of flash memory having high speed serial interfaces and a low I/O pin requirement.

The memory interfaces 314 and 318 could be implemented according to the memory interface of FIG. 2, for example. While DRAMs and SSDs are shown by way of example, it should be understood that other types of memory elements could be implemented, where the selection of a particular type of memory device is based upon operating parameters of the memory devices, as will be described in more detail below. While the memory devices of the first and second plurality of memory devices 316 and 320 are shown separate from the integrated circuit 302, it should be understood that the memory devices could be implemented on the integrated circuit 302, and the circuits and methods for implementing a plurality of memory devices of different types associated with the key-value store could be implemented in a single integrated circuit.

The selection of one or more memory elements for accessing data of a key-value store enables efficient operation of the key-value store by considering the access properties of different memory devices to determine which types of memory device to use for various data of the key-value store. According to one implementation, the memory management circuit divides a data block into a first data portion and a second data portion, where the first data portion and the second data portion are provided to different memory types. According to another implementation, the memory management circuit routes data (either as a full data block or a portion of a data block) to a selected memory type based upon access criteria, such as the speed or frequency of access for example.

One important aspect of SSDs is related to its block-wise access characteristic and a low I/O pin requirement. While this access characteristic may detrimental in some applications for implementing a key-value store, this access characteristic can be used advantageously in other applications for implementing the key-value store. For example, accesses on an SSD that are smaller than page sizes (e.g. a 4 kilobyte page size), can become very inefficient. Therefore, to maximize the access performance, DRAMs are provided in addition to the SSDs to distribute the data between DRAMs and SSDs. However, DRAMs have a greater I/O pin requirement to transfer data. Accordingly, the selection of memory elements in the hybrid implementation may take a number of factors into account.

According to one implementation, the data accessed or stored in a KVS is divided into 2 portions. The portion of the value that consists of multiple page sizes is stored in the SSD, while the remainder is stored in DRAM. Therefore, the SSD is only accessed in full page sizes, maximizing the access performance. While additional overhead may be required to maintain a list and move values between DRAM and SSD, the hybrid architecture provides significantly improved performance. An example of the partitioning of data will be described in more detail in reference to FIG. 7.

Alternatively, values of a size which is smaller than a threshold are stored in DRAM, whereas values of a larger size are stored in SSDs. That is, rather than partitioning a block of data, a block of data associated with a key-value store may be stored in either a DRAM or an SSD based upon the size of the data block. This alternative implementation is useful for applications that have a value size distribution that matches the DRAM density and value density.

According to a further implementation, the distribution of data between different memory types could be based upon access frequency. Because access time to a given memory type may be different than another memory type, it may be beneficial to store data which is accessed frequently in a type of memory which has a fast access time. That is, data values which are accessed frequently are stored in DRAM. Such a partitioning of a data block illustrates an implementation where the DRAM is essentially a cache to the SSD, which works best for use cases where smaller values are accessed more frequently.

Figure 4:
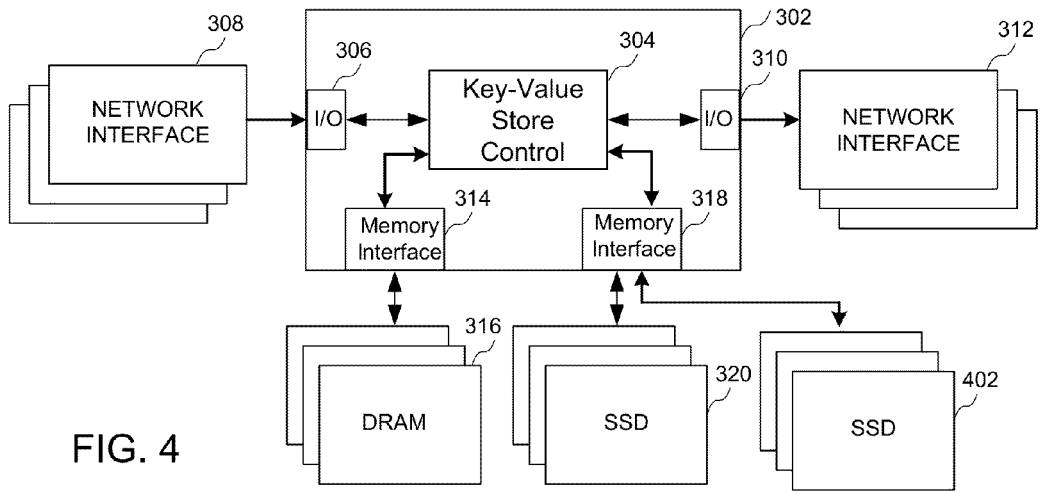
FIG. 4 is a block diagram of a circuit for enabling a key-value store implementing a plurality of memory types and using multiple interfaces in parallel to improve access bandwidth.

Turning now to FIG. 4, a block diagram of a circuit for enabling a key-value store implementing a plurality of memory types and having a parallel store operation is shown. SSDs can be over-provisioned to effectively reduce the page size. According to the implementation of FIG. 4, a plurality of memories 402, also shown as SSDs, are provided in addition to the plurality of memories 320. The memories 402 store the same content as the memories 320, and are accessed in parallel with the memories 320. While providing many SSDs in parallel in the described way does not increase the value store size itself, the access bandwidth of the SSDs will be increased as the same content can now be accessed over multiple links.

Figure 5:
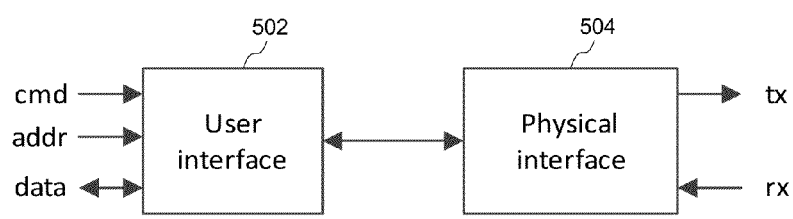
FIG. 5 is a block diagram of a memory controller for a first type of memory.
Figure 6:
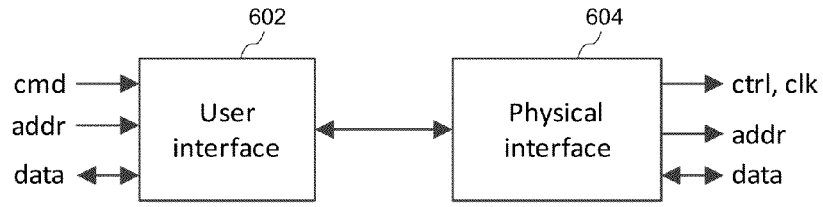
FIG. 6 is a block diagram of a memory controller for a second type of memory.

Because different memory types are used, different memory interfaces are also required. As shown in FIG. 5, a block diagram of a memory interface for a first type of memory is shown. By way of example, the memory controller of FIG. 5 could be used for an SSD. The memory controller of FIG. 5 comprises a user interface 502 and a physical interface 504. The user interface 502 receives command (cmd) and address (addr) information which is communicated with the physical interface 504. Data is also communicated by way of the physical interface as transmit (tx) or receive (rx) data. When implemented as a controller for an SSD, the transmit and receive data represents serial data. Accordingly, the circuit of FIG. 5 would be implemented for each SSD of the pluralities of memories 320 and 402. A user interface 602 for another type of memory also receives command (cmd) and address (addr) information which is communicated with the physical interface 604. In addition to data which is communication by way of the physical interface 604, control (ctrl), clock (clk), and address (addr) signals are also transmitted. When implemented with a DRAM, the physical interface of FIG. 6 communicates parallel data.

Figure 7:
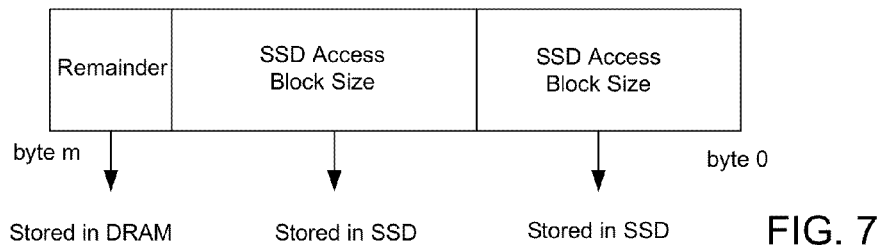
FIG. 7 is a diagram showing the allocation of data of a block of data to different types of memory in the implementation of a key-value store.

Turning now to FIG. 7, a diagram shows the allocation of data of a block of data to different types of memory. As set forth above, more efficient operation of a key-value store can be achieved by storing portions of a data block corresponding to an SSD access block size of an SSD in one or more SSDs, and storing a remainder in a DRAM. That is, a modulo function can be implemented to determine a remainder value (which is less than the SSD access block size) that would be stored in a DRAM. As shown in FIG. 7, a block of data having m+1 bytes includes two blocks having the SSD block size, and a remainder. Accordingly, each of the two blocks is stored in the SSD, while the remainder is stored in a DRAM. By way of example, if a data block has between 8 and 12 kilobytes (e.g. 8 kilobytes and 10 bytes), that two blocks of 4 kilobytes would be stored in SSDs, and 10 bytes would be stored in DRAM.

Figure 8:
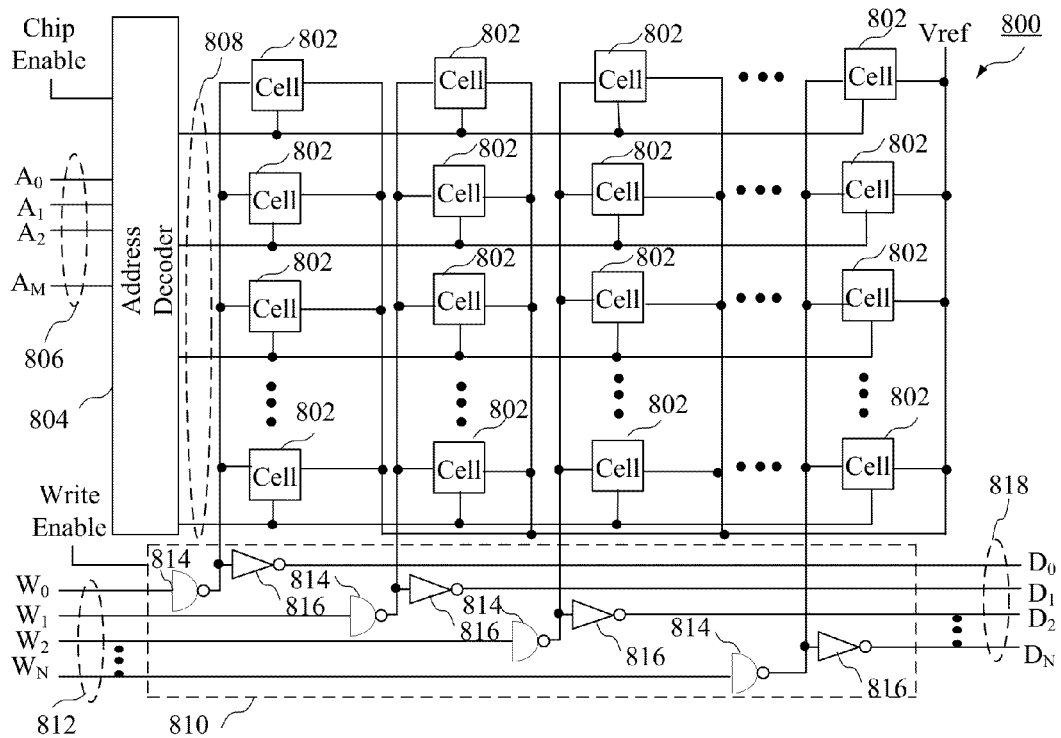
FIG. 8 is a block diagram of a dynamic random access memory (DRAM)

Turning now to FIG. 8, a block diagram of a dynamic random access memory (DRAM) is shown. The DRAM block 400 comprises a plurality of cells 802, each of which is coupled to an address decoder 804. The address decoder 804 receives address lines 806, and generates an address which is coupled to the plurality of memory cells 802 as is shown. The address decoder 804 receives a chip enable signal, and each of the memory cells 802 receives a reference voltage Vref. A write block 810 enables the reading of data from or the writing of data to the memory cells 802. In particular, data provided by way of data lines 812 are written to an address provided to an address decoder if a write enable signal provided to the write block 810 enables writing to the memory cells 802 by way of the gates 814. If the write enable signal is not enabling writing to the memory cells 802, data coupled to inverters 816 is generated on data lines 818. As will be described in more detail below, data stored in the cells of the DRAM block must be periodically refreshed to retain the data.

Figure 9:
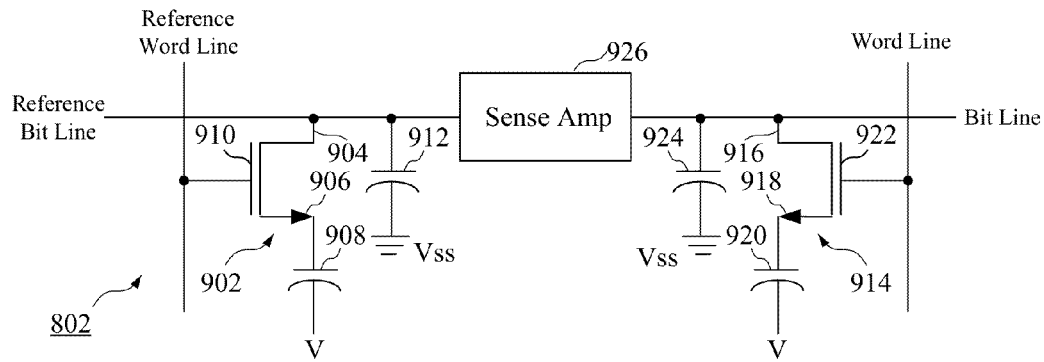
FIG. 9 is a block diagram of a memory element of the DRAM of FIG. 8.

Turning now to FIG. 9, a block diagram of a memory element of the DRAM of FIG. 8 is shown. In particular, a first transistor 902 has a drain 904 coupled to a reference bit line and a source 906 coupled to a capacitor 908. The transistor 902 is controlled at a gate by a reference word line. A second transistor 914 has a drain 916 coupled to a bit line and a source 918 coupled to a capacitor 920. The transistor 914 is controlled at a gate by a word line. Data is written by pulling the word line high, and applying the desired value to be stored to the bit line to charge the capacitor 920. In order to read data from the memory, the sense amp 926 will detect a difference between the voltage stored on the capacitor 912 at the reference bit line and the voltage stored on the capacitor 924 at the bit line to generate an output value. After the value of the bit line is determined, that value is re-written to the bit line by storing the appropriate charge on the capacitor 924. That is, the capacitor 924 is periodically recharged to maintain the correct value of data stored by the cell. While an individual DRAM memory cell is beneficial because it is smaller than an SRAM cell, the DRAM memory cell must be periodically refreshed to maintain the charge on the capacitor representing the stored data and may have a longer access time than the SRAM cell.

Figure 10:
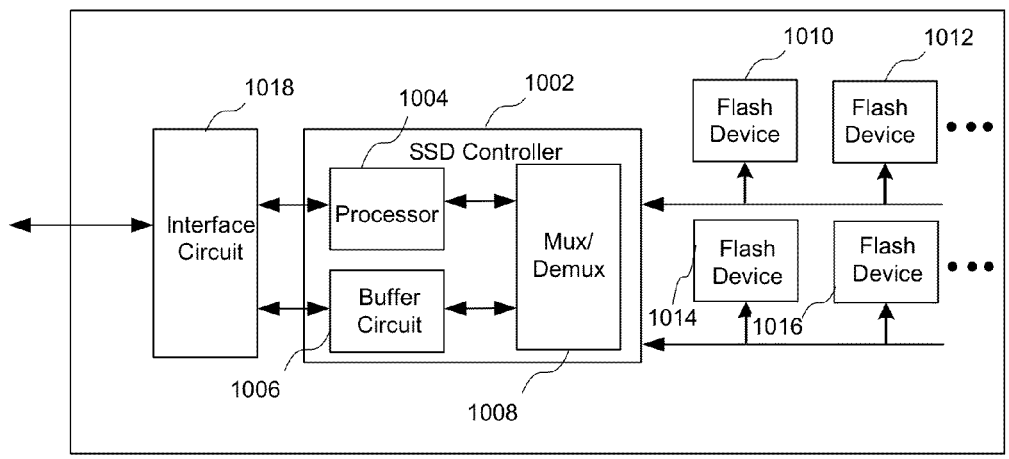
FIG. 10 is a block diagram of a solid-state drive (SSD) memory.

Turning now to FIG. 10, a block diagram of a solid-state drive (SSD) memory is shown. The SSD comprises an SSD controller 1002 having a processor 1004 and buffer circuit 1006, each of which interfaces with a multiplexer/demultiplexer 1008. The multiplexer/demultiplexer circuit 1008 receives data from and provides data to one of a plurality of Flash devices 1010-1016. An interface circuit 1018 enables the transfer of data between the SSD and a memory interface of a device, such as the memory interface 318 of the FPGA 302.

Figure 11:
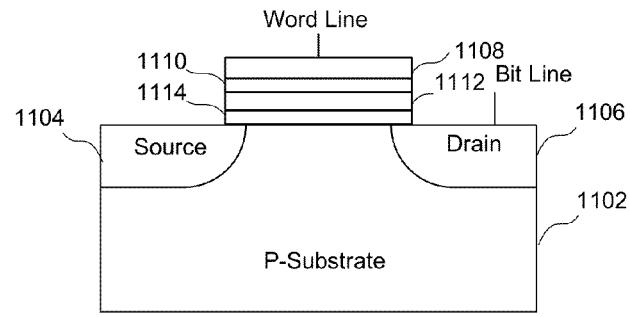
FIG. 11 is a block diagram of a memory element of the solid-state drive of FIG. 9.

Turning now to FIG. 11, a block diagram of a memory element of the solid-state disk of FIG. 10 is shown. The memory element of FIG. 11 comprises a substrate 1102 having a source 1104 and a drain 1106 which is controlled by a bit line. A word line controls a gate element having a control gate 1108 separated by an oxide layer 1110 from a floating gate 1112 on an oxide layer 1114. While examples of circuits associated with DRAM and SSD memory devices are provided, it should be understood that other circuits could be implemented.

Figure 12:
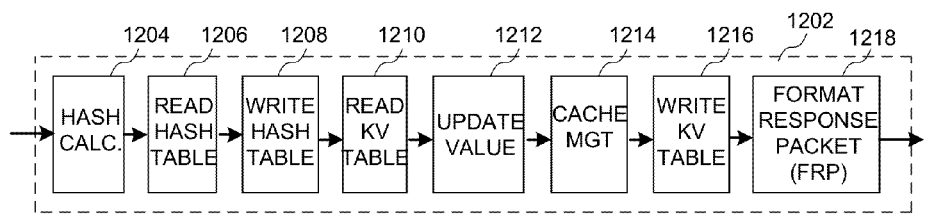
FIG. 12 is a flow diagram showing the processing of data associated with a key-value store.

Turning now to FIG. 12, a flow diagram shows the processing of data associated with a key-value store. According to one implementation, a pipeline of circuit blocks 1202 includes blocks to implement a key-value store. The pipeline of circuit blocks 1202 according to FIG. 12 include a hash calculation circuit 1204, a read hash table circuit 1206, a write hash table circuit 1208, and read key-value (KV) circuit 1210, an update value circuit 1212, a cache management circuit 1214, a write KV table 1216, and a format response packet block 1218. Various circuits, such as memory or control circuits, external to the pipeline of circuit blocks 108 may also be employed, such as the memory management circuit 108 or the hash table memory interface 111.

Figure 14:
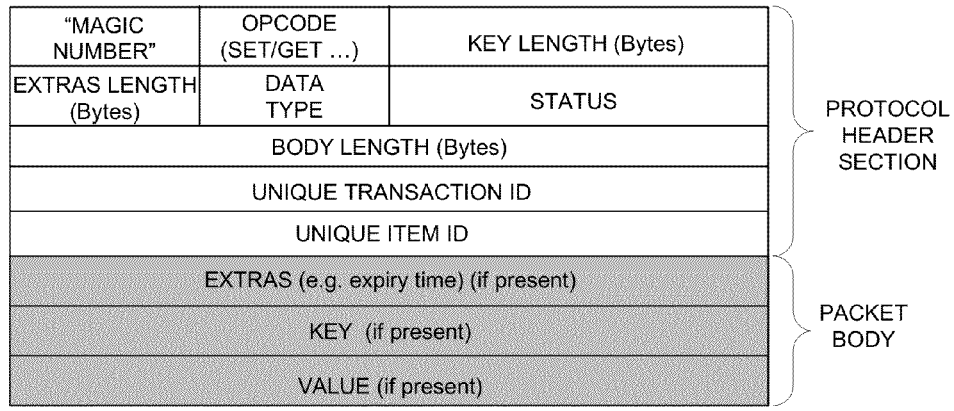
FIG. 14 is a diagram showing fields of a data packet for implementing a key-value store.

While a particular order of circuit blocks in the pipeline of circuit blocks 108 is shown in FIG. 12, it should be understood that the circuit blocks could be arranged in a different order, and the particular order of FIG. 12 is shown by way of example. Further, while the pipeline of circuit blocks enables the implementation of a key-value store, the pipeline of circuit blocks could include other circuit blocks which implement a different function. Transaction state information can be communicated as a part of the header of a packet, in one of the fields as shown in FIG. 14 or in a separate header field for state information. By way of example, the transaction state could provide a listing of functions for circuit blocks of a pipeline, such as (execute hash, execute read hash, execute write hash, execute read key . . . ). Alternatively, the state information could be sent as a sub-channel with shared flow control.

Figure 13:
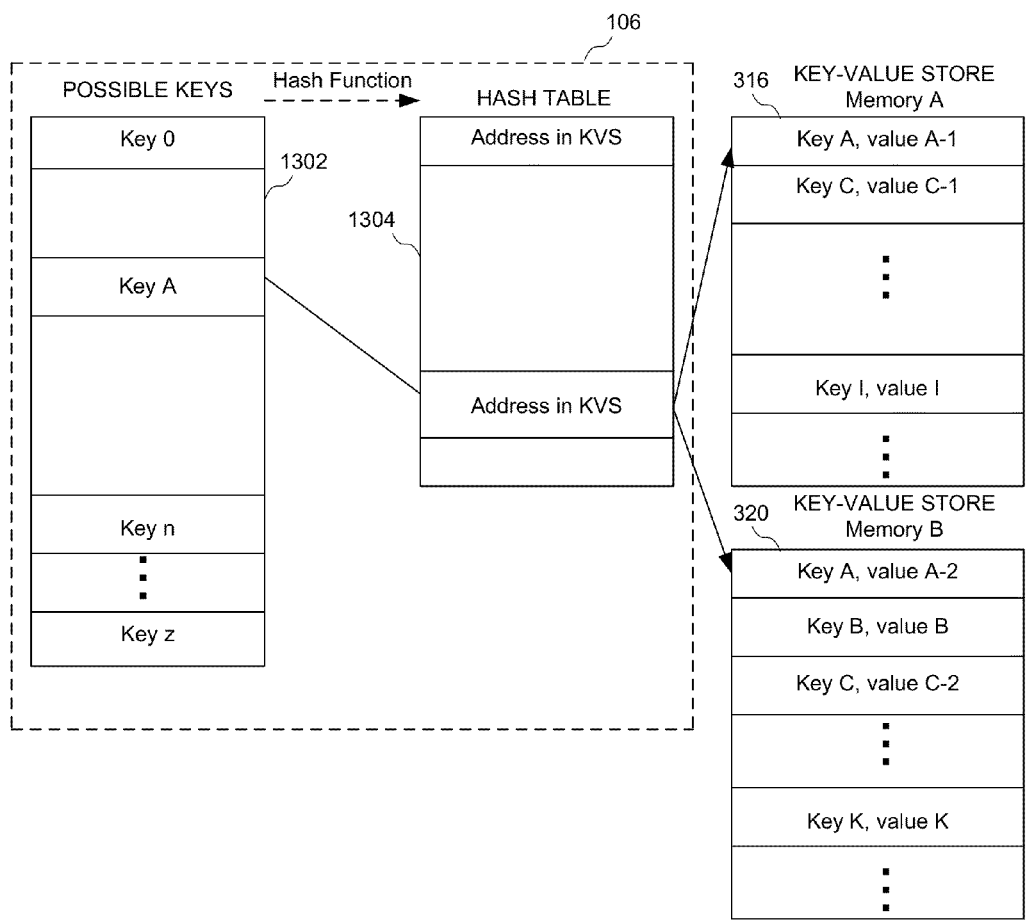
FIG. 13 includes tables showing the operation of a key-value store.

The memory management circuit 108 maps a "hash" value, which is easily computed from the key, to a unique memory address within the key-value store, shown in FIG. 13 as two memory elements, and more particularly a Key-Value Store Memory A of the plurality of memory devices 316 and a Key-Value Store Memory B of the plurality of memory devices 320. A hash function maps all possible keys 1302 to an address in the associated hash table 1304 as is shown in FIG. 13. The hash table then maps to an address in the actual key-value store. Each value of the key-value store comprises a key and a corresponding value, where the value of the store may be split into multiple memory devices. Alternatively, the key could be stored in the hash table together with an address to the value which resides in the key-value store, which would be functioning as just a value store. Accordingly, the key-value store could be implemented using a hash table storing the keys and a memory storing the values associated with the keys. The hash table generates the necessary addresses to access the data which is stored in multiple memory devices. As shown in FIG. 13, both a value A-1 associated with the key-value store memory A and a value A-2 associated with the key-value store Memory B are accessed based upon addresses associated with the Key A. As shown in FIG. 13, values associated with other keys (e.g. Key C) are also stored in both key-value store Memory A and key-value store Memory B, while a value associated with another key (e.g. Key I) is stored in only a single memory.

In operation, the circuit of FIG. 1 receives incoming requests through a network interface 104. Basic network protocols are then processed in the Network L2-L4 Processing block 102. Typically this would include a media access control (MAC) block, followed by UDP and TCP processing. Packets generated by the Networking Processing block 102 are then passed to the KVS protocol processing block 104 which determines the packet flow through the processing pipeline. The processing blocks which need to be activated, which may be considered a processing transaction state, is then passed together with the packet through the pipeline. Each stage in the processing pipeline then examines relevant state bits to decide what processing (if any) to perform on a packet before passing it onto the next stage.

Accordingly, the processing pipeline contains blocks for calculating the hash function, for reading from or writing to the hash table, reading from or writing to the key-value store, modifying the values, formatting response packets and other necessary atomic operations. Accordingly, the processing pipeline effectively implements the superset of all atomic operations that are part of the key-value store transaction protocol. It should be noted that these atomic operations can be implemented in many different ways including through programmable resources, dedicated hardware blocks or through conventional microprocessors.

Turning now to FIG. 14, a diagram shows fields of a data packet for implementing a key-value store. In particular, the data packet comprises a protocol header section and a packet body. The protocol header section has various fields including a Magic Number field, an Opcode field, a key length field, an extras length field, a data type field, a status field, a body length field, a unique transaction ID, and a unique item ID. The packet body may include an Extras field, a key and a value.

Figure 15:
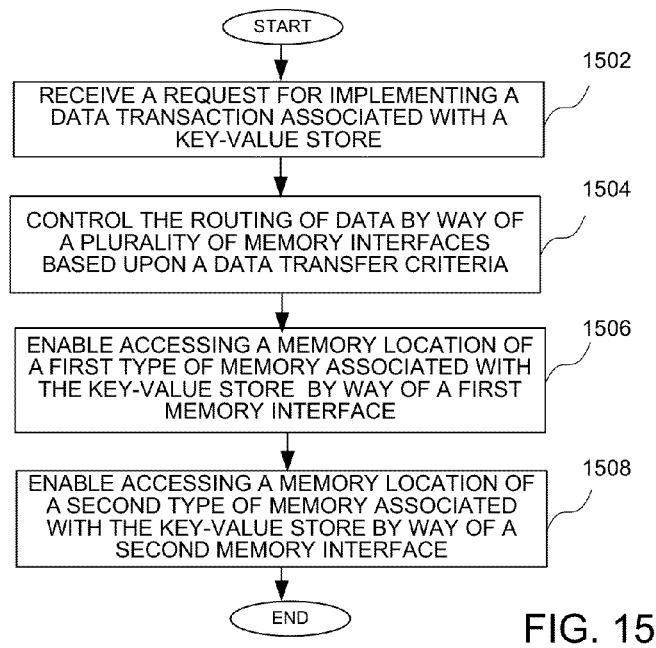
FIG. 15 is a flow chart showing a method of processing data associated with a key-value store.

Turning now to FIG. 15, a flow chart shows a method of processing data associated with a key-value store. A request for implementing a data transaction associated with a key-value store is received at a step 1502. The routing of data by way of a plurality of memory interfaces is controlled based upon a data transfer criteria at a step 1504. A memory location of a first type of memory associated with a first memory interface is able to be accessed at a step 1506. A memory location of a second type of memory associated with the key-value store a second memory interface is able to be accessed at a step 1508. The method of FIG. 15 could be implemented using the circuits of FIGS. 1-4 as described above, and in an integrated circuit having programmable resources as described below in reference to FIGS. 16-18.

Figure 16:
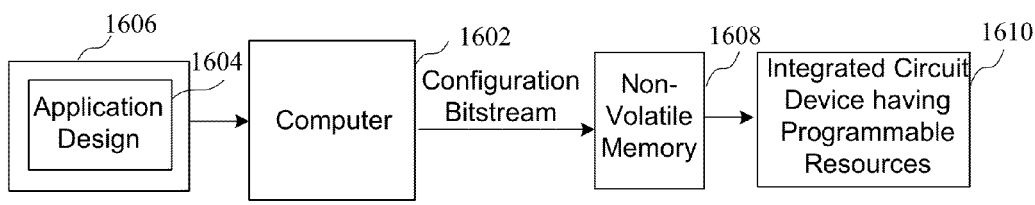
FIG. 16 is a block diagram of a system for programming a device having programmable resources.

Turning now to FIG. 16, a block diagram of a system for programming a device having programmable resources according to an implementation is shown. In particular, a computer 1602 is coupled to receive an application design 1604 from a memory 1606, and generate a configuration bitstream which is stored in the non-volatile memory 1608. As will be described in more detail below, the circuit design may be a high level design, such as a circuit design defined in a hardware description language (HDL). Also, the computer may be configured to run software that generates a configuration bitstream which is stored in the non-volatile memory 1608 and provided to an integrated circuit 1610 which may be a programmable integrated circuit, such as the integrated circuit described below in FIG. 17.

The software flow for a circuit design to be implemented in a programmable integrated circuit comprises synthesis, packing, placement and routing, as is well known in the art. Synthesis comprises the step of converting a circuit design in a high level design to a configuration of elements found in the programmable integrated circuit. For example, a synthesis tool operated by a computer may implement the portions of a circuit design implementing certain functions in configurable logic blocks (CLBs) or digital signal processing (DSP) blocks, for example. An example of a synthesis tool is the ISE tool available from Xilinx, Inc. of San Jose Calif. Packing comprises the step of grouping portions of the circuit design into defined blocks of the device, such as CLBs. Placing comprises the step of determining the location of the blocks of the device defined during the packing step. Finally, routing comprises selecting paths of interconnect elements, such as programmable interconnects, in a programmable integrated circuit. At the end of place and route, all functions, positions and connections are known, and a configuration bitstream is then created. The bitstream may be created by a software module called BitGen, available from Xilinx, Inc. of San Jose, Calif. The bitstream is either downloaded by way of a cable or programmed into an EPROM for delivery to the programmable integrated circuit.

Figure 17:
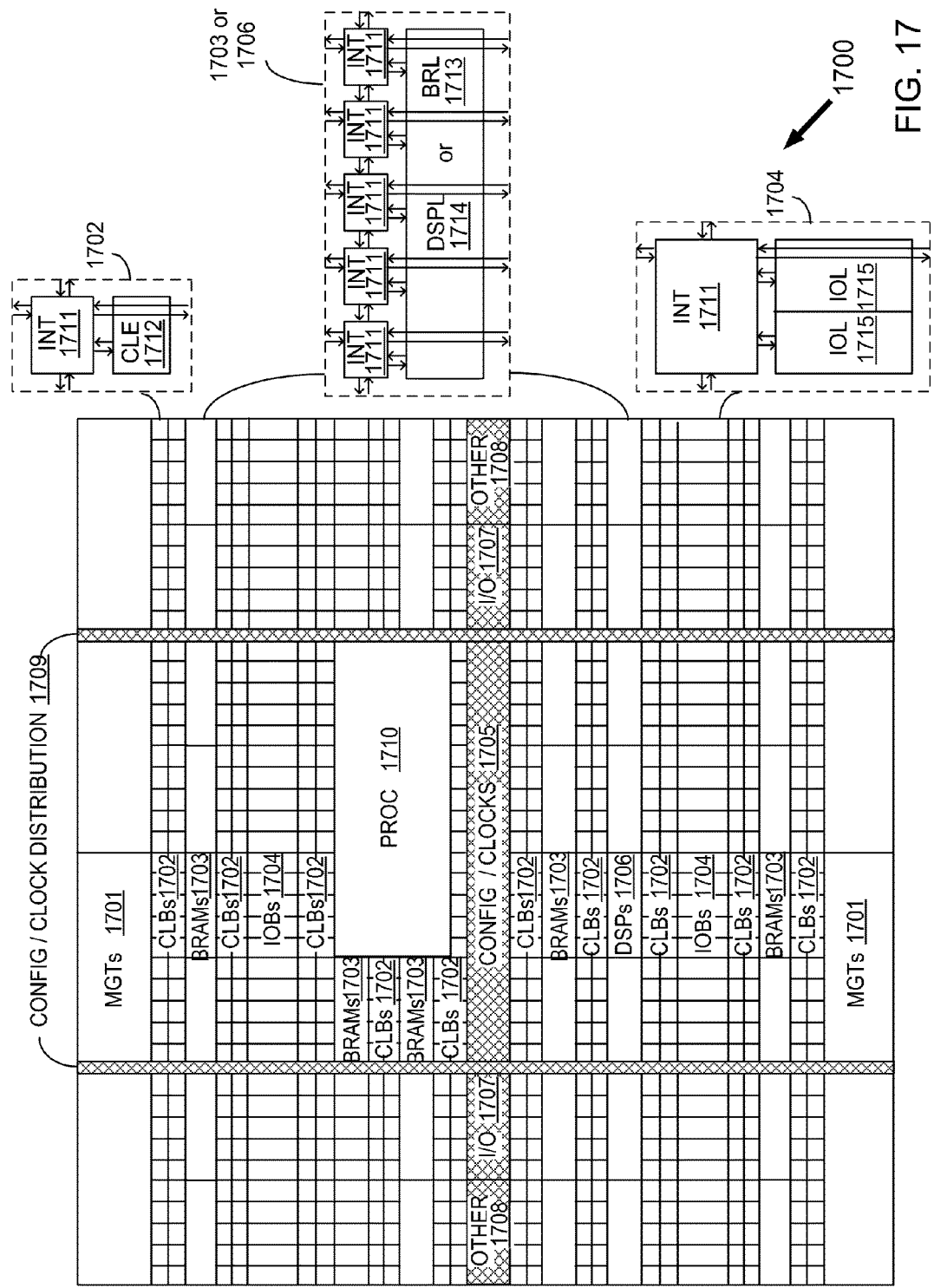
FIG. 17 is a block diagram of an integrated circuit having programmable resources.

Turning now to FIG. 17, a block diagram of an integrated circuit having programmable resources is shown. While devices having programmable resources may be implemented in any type of integrated circuit device, such as an application specific integrated circuit (ASIC) having programmable resources, other devices comprise dedicated programmable logic devices (PLDs). One type of PLD is the Complex Programmable Logic Device (CPLD). A CPLD includes two or more "function blocks" connected together and to input/output (I/O) resources by an interconnect switch matrix. Each function block of the CPLD includes a two-level AND/OR structure similar to that used in a Programmable Logic Array (PLA) or a Programmable Array Logic (PAL) device. Another type of PLD is a field programmable gate array (FPGA). In a typical FPGA, an array of configurable logic blocks (CLBs) is coupled to programmable input/output blocks (IOBs). The CLBs and IOBs are interconnected by a hierarchy of programmable routing resources. These CLBs, IOBs, and programmable routing resources are customized by loading a configuration bitstream, typically from off-chip memory, into configuration memory cells of the FPGA. For both of these types of programmable logic devices, the functionality of the device is controlled by configuration data bits of a configuration bitstream provided to the device for that purpose. The configuration data bits may be stored in volatile memory (e.g., static memory cells, as in FPGAs and some CPLDs), in non-volatile memory (e.g., Flash memory, as in some CPLDs), or in any other type of memory cell.

The device of FIG. 17 comprises an FPGA architecture 1700 having a large number of different programmable tiles including multi-gigabit transceivers (MGTs) 1701, CLBs 1702, random access memory blocks (BRAMs) 1703, input/output blocks (IOBs) 1704, configuration and clocking logic (CONFIG/CLOCKS) 1705, digital signal processing blocks (DSPs) 1706, specialized input/output blocks (I/O) 1707 (e.g., configuration ports and clock ports), and other programmable logic 1708 such as digital clock managers, analog-to-digital converters, system monitoring logic, and so forth. Some FPGAs also include dedicated processor blocks (PROC) 1710, which may be used to implement a software application, for example.

In some FPGAs, each programmable tile includes a programmable interconnect element (INT) 1711 having standardized connections to and from a corresponding interconnect element in each adjacent tile. Therefore, the programmable interconnect elements taken together implement the programmable interconnect structure for the illustrated FPGA. The programmable interconnect element 1711 also includes the connections to and from the programmable logic element within the same tile, as shown by the examples included at the top of FIG. 17.

For example, a CLB 1702 may include a configurable logic element (CLE) 1712 that may be programmed to implement user logic plus a single programmable interconnect element 1711. A BRAM 1703 may include a BRAM logic element (BRL) 1713 in addition to one or more programmable interconnect elements. The BRAM includes dedicated memory separate from the distributed RAM of a configuration logic block. Typically, the number of interconnect elements included in a tile depends on the height of the tile. In the pictured implementation, a BRAM tile has the same height as five CLBs, but other numbers may also be used. A DSP tile 1706 may include a DSP logic element (DSPL) 1714 in addition to an appropriate number of programmable interconnect elements. An IOB 1704 may include, for example, two instances of an input/output logic element (IOL) 1715 in addition to one instance of the programmable interconnect element 1711. The location of connections of the device is controlled by configuration data bits of a configuration bitstream provided to the device for that purpose. The programmable interconnects, in response to bits of a configuration bitstream, enable connections comprising interconnect lines to be used to couple the various signals to the circuits implemented in programmable logic, or other circuits such as BRAMs or the processor.

In the pictured implementation, a columnar area near the center of the die is used for configuration, clock, and other control logic. The config/clock distribution regions 1209 extending from this column are used to distribute the clocks and configuration signals across the breadth of the FPGA. Some FPGAs utilizing the architecture illustrated in FIG. 17 include additional logic blocks that disrupt the regular columnar structure making up a large part of the FPGA. The additional logic blocks may be programmable blocks and/or dedicated logic. For example, the processor block PROC 1710 shown in FIG. 17 spans several columns of CLBs and BRAMs.

Note that FIG. 17 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 17 are purely exemplary. For example, in an actual FPGA more than one adjacent column of CLBs is typically included wherever the CLBs appear in order to facilitate the efficient implementation of user logic. While the implementation of FIG. 17 relates to an integrated circuit having programmable resources, it should be understood that the circuits and methods set forth in more detail below could be implemented in any type of ASIC.

In one implementation, an MGT 1701 includes the characterized receiver and certain CLBs 1702 are configured to implement the eye-scan controller and the PRBS data checker using error indications stored in a BRAM 1703.

Figure 18:
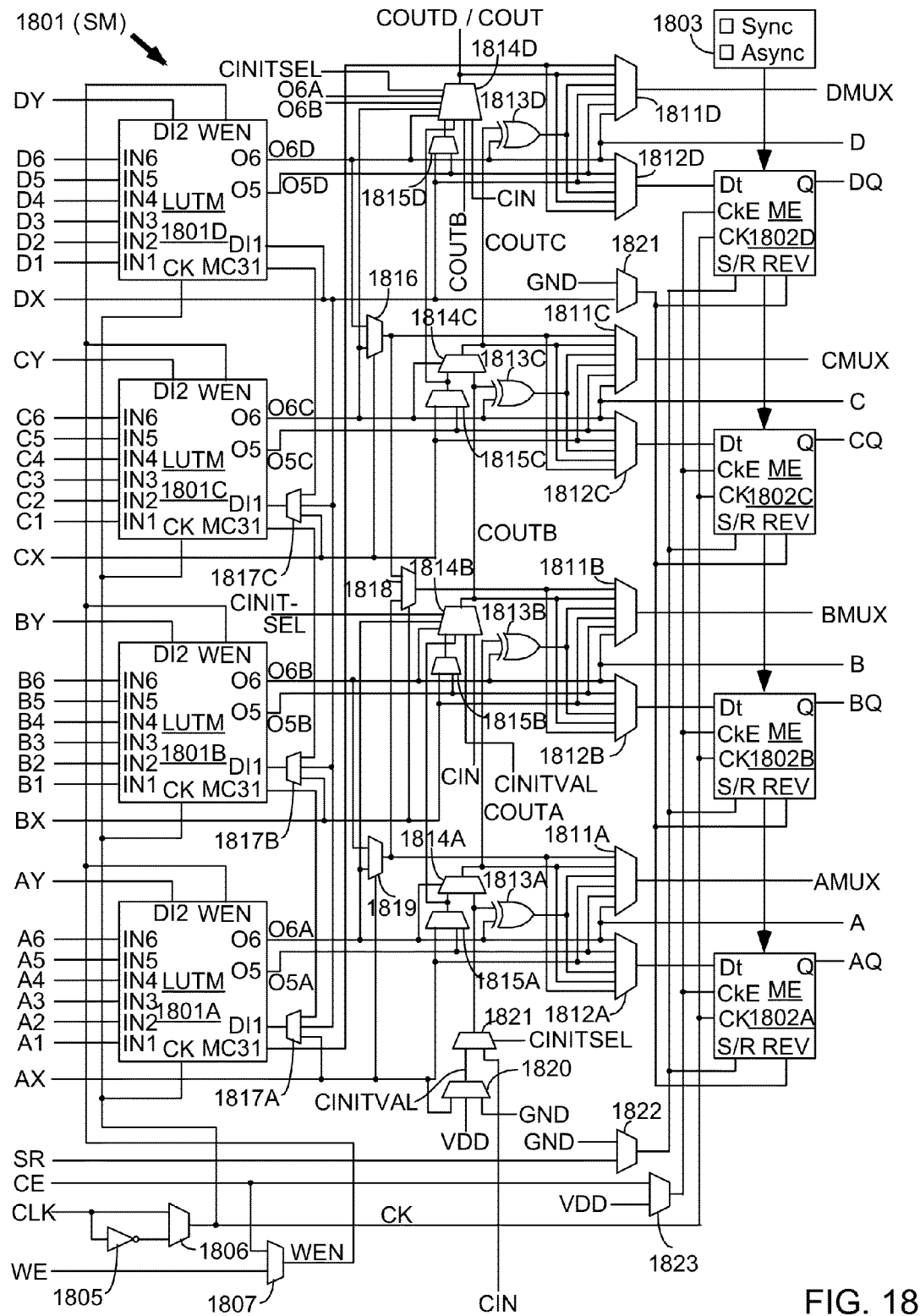
FIG. 18 is a block diagram of a configurable logic element of the integrated circuit of FIG. 17.

Turning now to FIG. 18, a block diagram of a configurable logic element of the integrated circuit of FIG. 17 is shown. In particular, FIG. 18 illustrates in simplified form a configurable logic element of a configuration logic block 1702 of FIG. 17. In the implementation of FIG. 18, slice M 1801 includes four lookup tables (LUTMs) 1801A-1801 D, each driven by six LUT data input terminals A1-A6, B1-B6, C1-C6, and D1-D6 and each providing two LUT output signals O5 and O6. The O6 output terminals from LUTs 1801A-1801D drive slice output terminals A-D, respectively. The LUT data input signals are supplied by the FPGA interconnect structure via input multiplexers, which may be implemented by programmable interconnect element 1811, and the LUT output signals are also supplied to the interconnect structure. Slice M also includes: output select multiplexers 1811A-1811D driving output terminals AMUX-DMUX; multiplexers 1812A-1812D driving the data input terminals of memory elements 1802A-1802D; combinational multiplexers 1816, 1818, and 1819; bounce multiplexer circuits 1822-1823; a circuit represented by inverter 1805 and multiplexer 1806 (which together provide an optional inversion on the input clock path); and carry logic having multiplexers 1814A-1814D, 1815A-1815D, 1820-1821 and exclusive OR gates 1813A-1813D. All of these elements are coupled together as shown in FIG. 18. Where select inputs are not shown for the multiplexers illustrated in FIG. 18, the select inputs are controlled by configuration memory cells. That is, configuration bits of the configuration bitstream stored in configuration memory cells are coupled to the select inputs of the multiplexers to select the correct inputs to the multiplexers. These configuration memory cells, which are well known, are omitted from FIG. 18 for clarity, as well as from other selected figures herein.

In the pictured implementation, each memory element 1802A-1802D may be programmed to function as a synchronous or asynchronous flip-flop or latch. The selection between synchronous and asynchronous functionality is made for all four memory elements in a slice by programming Sync/Asynch selection circuit 1803. When a memory element is programmed so that the S/R (set/reset) input signal provides a set function, the REV input terminal provides the reset function. When the memory element is programmed so that the S/R input signal provides a reset function, the REV input terminal provides the set function. Memory elements 1802A-1802D are clocked by a clock signal CK, which may be provided by a global clock network or by the interconnect structure, for example. Such programmable memory elements are well known in the art of FPGA design. Each memory element 1802A-1802D provides a registered output signal AQ-DQ to the interconnect structure. Because each LUT 1801A-1801D provides two output signals, O5 and O6, the LUT may be configured to function as two 5-input LUTs with five shared input signals (IN1-IN5), or as one 6-input LUT having input signals IN1-IN6.

In the implementation of FIG. 13, each LUTM 1801A-1801D may function in any of several modes. When in lookup table mode, each LUT has six data input signals IN1-IN6 that are supplied by the FPGA interconnect structure via input multiplexers. One of 64 data values is programmably selected from configuration memory cells based on the values of signals IN1-IN6. When in RAM mode, each LUT functions as a single 64-bit RAM or two 32-bit RAMs with shared addressing. The RAM write data is supplied to the 64-bit RAM via input terminal DI1 (via multiplexers 1817A-1817C for LUTs 1301A-1301C), or to the two 32-bit RAMs via input terminals DI1 and DI2. RAM write operations in the LUT RAMs are controlled by clock signal CK from multiplexer 1806 and by write enable signal WEN from multiplexer 1807, which may selectively pass either the clock enable signal CE or the write enable signal WE. In shift register mode, each LUT functions as two 16-bit shift registers, or with the two 16-bit shift registers coupled in series to create a single 32-bit shift register. The shift-in signals are provided via one or both of input terminals DI1 and DI2. The 16-bit and 32-bit shift out signals may be provided through the LUT output terminals, and the 32-bit shift out signal may also be provided more directly via LUT output terminal MC31. The 32-bit shift out signal MC31 of LUT 1801A may also be provided to the general interconnect structure for shift register chaining, via output select multiplexer 1811D and CLE output terminal DMUX. Accordingly, the circuits and methods set forth above may be implemented in a device such as the devices of FIGS. 17 and 18, or any other suitable device.

Accordingly, the circuits and methods set forth above relate to novel circuits and methods for processing data.

While specific reference is made to key-value stores, the circuit arrangements to FIGS. 1-3 can be extended for other related "big data" applications such as query processors, data scans, etc. It is intended that the specification and illustrated implementations be considered as examples only, with a true scope and spirit of the implementations being indicated by the following claims.

What is claimed is:

1. A circuit for processing data, the circuit comprising:
an input for receiving a request for implementing a key-value store data transaction that enables access to a store associated with a key;
a plurality of memory interfaces associated with different memory types enabling access to a plurality of memory devices associated with a key-value store;
a first memory device of a first type storing a first portion of a value of a store associated with the key-value store data transaction;
a second memory device of a second type storing a second portion of the value of the store associated with the key-value store data transaction, wherein the second portion of the value of the store associated with the key-value store data transaction is different than the first portion of the value of the store associated with the key-value store data transaction; and
a memory management circuit controlling the routing of data by way of the plurality of memory interfaces based upon a data transfer criterion.

2. The circuit of claim 1 wherein the memory management circuit controls the routing of a data block into a first data portion and a second data portion.

3. The circuit of claim 2 wherein the memory management circuit enables routing the first data portion of the data block by way of a first memory interface and routing the second data portion of the data block by way of a second memory interface.

4. The device of claim 1 wherein the memory management circuit routes a block of data to a selected memory type based upon an access criterion.

5. The circuit of claim 4 wherein the access criterion is based upon a size of the data of the data block.

6. The circuit of claim 4 wherein the access criterion is based upon an access frequency of the data of the data block.

7. The circuit of claim 1 wherein the plurality of memory interfaces comprises a first memory interface which enables routing data to a DRAM and a second memory interface which enables routing data to an SSD memory.

8. A circuit for processing data, the circuit comprising:
an input for receiving a request for implementing a key-value store data transaction that enables access to a store associated with a key;
a first memory interface enabling access to a memory location of a first type of memory storing a first portion of a value of a store associated with a key-value store;
a second memory interface enabling access to a memory location of a second type of memory storing a second portion of the value of the store associated with the key-value store, wherein the second portion of the value of the store associated with the key-value store is different than the first portion of the value of the store associated with the key-value store; and
a memory management circuit coupled between the input and the first and second memory interfaces, the memory management circuit controlling the routing of data by way of the first and second memory interfaces based upon a data transfer criterion.

9. The circuit of claim 8 wherein the memory management circuit routes a first portion of a data block by way of the first memory interface and a second portion of the data block by way of the second memory interface.

10. The circuit of claim 8 wherein the memory management circuit routes data by way of either the first memory interface or the second memory interface based upon a size of the data.

11. The circuit of claim 8 wherein the memory management circuit routes data by way of either the first memory interface or the second memory interface based upon an access frequency of the data.

12. The circuit of claim 8 wherein the first memory interface enables routing data to a DRAM memory and the second memory interface enables routing data to an SSD memory.

13. The circuit of claim 12 wherein data routed by way of the second memory interface is stored in multiple memory devices.

14. The device of claim 13 wherein the memory management circuit enables simultaneously accessing different blocks of data in the multiple memory devices.

15. A method of processing data, the method comprising:
receiving a request for implementing a data transaction associated with a key-value store that enables access to a store associated with a key;
controlling the routing of data by way of a plurality of memory interfaces based upon a data transfer criterion, wherein a first memory device of a first type of memory stores a first portion of a value of a store associated with the data transaction and a second memory device of a second type of memory stores a second portion of the value of the store associated with the data transaction that is different than the first portion of the value of the store associated with the data transaction;
enabling accessing a memory location of the first memory device associated with the key-value store by way of a first memory interface; and
enabling accessing a memory location of the second memory device associated with the key-value store by way of a second memory interface.

16. The method of claim 15 wherein controlling the routing of data by way of the plurality of memory interfaces based upon a data transfer criterion comprises routing a first portion of a data block by way of the first memory interface and a second portion of the data block by way of the second memory interface.

17. The method of claim 15 wherein controlling the routing of data by way of the plurality of memory interfaces based upon a data transfer criterion comprises routing data by way of either the first memory interface or the second memory interface based upon a size of the data.

18. The method of claim 15 wherein controlling the routing of data by way of the plurality of memory interfaces based upon a data transfer criterion comprises routing data by way of either the first memory interface or the second memory interface based upon an access frequency of the data.

19. The method of claim 15 wherein enabling accessing a memory location of the first memory device associated with the key-value store by way of a first memory interface comprises routing data to an SSD memory.

20. The method of claim 19 wherein enabling accessing a memory location of the second memory device associated with the key-value store by way of a second memory interface comprises routing data to a DRAM.

* * * * *